(12) United States Patent
Lee et al.

(10) Patent No.: US 11,410,815 B2
(45) Date of Patent: Aug. 9, 2022

(54) MULTILAYER CERAMIC CAPACITOR

(71) Applicant: SAMSUNG ELECTRO-MECHANICS CO., LTD., Suwon-si (KR)

(72) Inventors: Min Gon Lee, Suwon-si (KR); Taek Jung Lee, Suwon-si (KR); Jin Man Jung, Suwon-si (KR); Jin Kyung Joo, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/817,783

(22) Filed: Mar. 13, 2020

(65) Prior Publication Data

US 2021/0057158 A1    Feb. 25, 2021

(30) Foreign Application Priority Data

Aug. 19, 2019  (KR) .......................... 10-2019-0101362

(51) Int. Cl.
*H01G 4/232*    (2006.01)
*H01G 4/012*    (2006.01)
(Continued)

(52) U.S. Cl.
CPC .......... *H01G 4/2325* (2013.01); *H01G 4/008* (2013.01); *H01G 4/012* (2013.01); *H01G 4/30* (2013.01)

(58) Field of Classification Search
CPC ...... H01G 4/008; H01G 4/012; H01G 4/1209; H01G 4/2325; H01G 4/30; H01G 4/302
See application file for complete search history.

(56) References Cited

U.S. PATENT DOCUMENTS 10,361,035 B1 * 7/2019 Song ................ H01G 4/224
10,784,047 B2 * 9/2020 Song .................. H01G 4/2325
(Continued)

FOREIGN PATENT DOCUMENTS

CN    103730254 A    4/2014
CN    104517730 A    4/2015
(Continued)

OTHER PUBLICATIONS

Office Action issued in corresponding Korean Patent Application No. 10-2019-0101362 dated Oct. 6, 2020, with English translation.
(Continued)

*Primary Examiner* — Nathan Milakovich
(74) *Attorney, Agent, or Firm* — Morgan, Lewis & Bockius LLP

(57) ABSTRACT

A multilayer ceramic capacitor includes a body including a dielectric layer and first and second internal electrodes disposed with the dielectric layer interposed therebetween; first and second through electrodes penetrating the body, connected to the first and second internal electrodes, respectively, and including nickel; first and second external electrodes, and connected to the first through electrode; and third and fourth external electrodes spaced apart from the first and second external electrodes, and connected to the second through electrode. Each of the first to fourth external electrodes includes a sintered electrode including nickel, and a first plating layer and a second plating layer stacked on the sintered electrode in order.

12 Claims, 9 Drawing Sheets

(51) Int. Cl.
*H01G 4/008* (2006.01)
*H01G 4/30* (2006.01)

(56) References Cited

U.S. PATENT DOCUMENTS

| | | | |
|---|---|---|---|
| 10,903,009 B2* | 1/2021 | Seo | H01G 4/2325 |
| 10,978,251 B2* | 4/2021 | Song | H01G 4/232 |
| 2002/0005541 A1* | 1/2002 | Park | H01L 23/64 |
| | | | 257/306 |
| 2003/0060353 A1 | 3/2003 | Miki et al. | |
| 2013/0088810 A1 | 4/2013 | Yang et al. | |
| 2014/0104750 A1 | 4/2014 | Ahn et al. | |
| 2015/0090485 A1 | 4/2015 | Lee et al. | |
| 2015/0302991 A1 | 10/2015 | Choi | |
| 2016/0071647 A1 | 3/2016 | Nishisaka et al. | |
| 2016/0284475 A1* | 9/2016 | Onoue | H01G 4/30 |
| 2018/0027656 A1* | 1/2018 | Jung | H05K 1/111 |
| | | | 174/260 |
| 2018/0027658 A1 | 1/2018 | Choi et al. | |
| 2018/0068796 A1* | 3/2018 | Seo | H01G 4/30 |
| 2019/0074138 A1 | 3/2019 | Choi | |
| 2019/0096577 A1* | 3/2019 | Uenishi | H01G 4/12 |
| 2020/0006001 A1* | 1/2020 | Lee | H01G 4/2325 |
| 2020/0105476 A1 | 4/2020 | Song et al. | |
| 2020/0395176 A1* | 12/2020 | Song | H01G 4/2325 |
| 2021/0005384 A1* | 1/2021 | Lee | H01G 4/008 |
| 2021/0005386 A1* | 1/2021 | Lee | H01G 4/30 |
| 2021/0005387 A1* | 1/2021 | Kwon | H01G 4/012 |
| 2021/0005389 A1* | 1/2021 | Lee | H01G 4/012 |
| 2021/0005392 A1* | 1/2021 | Lee | H01G 4/008 |
| 2021/0035739 A1* | 2/2021 | Lee | H01G 2/02 |
| 2021/0057159 A1* | 2/2021 | Lee | H01G 4/228 |

FOREIGN PATENT DOCUMENTS

| | | |
|---|---|---|
| CN | 105405651 A | 3/2016 |
| CN | 107195459 A | 9/2017 |
| CN | 107644735 A | 1/2018 |
| CN | 107644736 A | 1/2018 |
| CN | 110993331 A | 4/2020 |
| JP | H07-201637 A | 8/1995 |
| JP | 2003-100144 A | 4/2003 |
| KR | 10-2015-0119626 A | 10/2015 |
| KR | 10-2018-0029215 A | 3/2018 |
| KR | 10-2018-0068911 A | 6/2018 |
| KR | 10-2019-0027452 A | 3/2019 |
| KR | 10-2019-0036479 A | 4/2019 |

OTHER PUBLICATIONS

Chinese Office Action dated Jun. 22, 2022, issued in corresponding Chinese Patent Application No. 202010453382.9 (with English translation).

* cited by examiner

MULTILAYER CERAMIC CAPACITOR

CROSS-REFERENCE TO RELATED APPLICATION(S)

The present application claims the benefit of priority to Korean Patent Application No. 10-2019-0101362 filed on Aug. 19, 2019 in the Korean Intellectual Property Office, the entire disclosure of which is incorporated herein by reference.

TECHNICAL FIELD

The present disclosure relates to a multilayer ceramic capacitor.

BACKGROUND

Electronic devices including a multilayer ceramic capacitor (MLCC) have recently been increasingly used. A greater number of capacitors have been used in smartphones in the 5th generation era, and such capacitors are required to have high capacity. A mounting area of a passive component such as an MLCC and an inductor, however, has decreased as a size of a set product has been reduced, and accordingly, there has been increasing demand for reducing a size of a passive component. In accordance with the demand, an MLCC and an inductor may be packaged with an IC and an AP, may be embedded in a substrate, or may be mounted on a lower end of an AP in a LSC manner to improve mounting flexibility.

Accordingly, a mounting area may decrease, and ESL occurring in a substrate may also decrease. Thus, there has been increasing demand for an MLCC product having a reduced thickness.

However, when a lower surface electrode is applied to a low profile capacitor having a reduced thickness, such as an embedded capacitor, a surface-mount capacitor, and the like, cohesion force between a lower surface electrode and a metal plating layer may decrease.

SUMMARY

An aspect of the present disclosure is to provide a multilayer ceramic capacitor having improved cohesion strength when the multilayer ceramic capacitor is mounted on or embedded in a substrate.

Another aspect of the present disclosure is to provide a multilayer ceramic capacitor having a reduced size and thickness and having improved reliability.

According to an aspect of the present disclosure, a multilayer ceramic capacitor is provided, the multilayer ceramic capacitor including a body including a dielectric layer and first and second internal electrodes disposed with the dielectric layer interposed therebetween, and having a first surface and a second surface opposing each other in a first direction, a third surface and a fourth surface opposing each other in a second direction, and a fifth surface and a sixth surface opposing each other in a third direction; first and second through electrodes penetrating the body, connected to the first and second internal electrodes, respectively, and including nickel; first and second external electrodes disposed on the first surface and the second surface, respectively, and connected to the first through electrode; and third and fourth external electrodes spaced apart from the first and second external electrodes, and connected to the second through electrode. Each of the first to fourth external electrodes includes a sintered electrode including nickel, and a first plating layer and a second plating layer stacked on the sintered electrode in order.

BRIEF DESCRIPTION OF DRAWINGS

The above and other aspects, features, and advantages of the present disclosure will be more clearly understood from the following detailed description, taken in conjunction with the accompanying drawings, in which:

FIG. 3A is a cross-sectional diagram illustrating a first internal electrode, and FIG. 3B is a cross-sectional diagram illustrating a second internal electrode;

FIG. 6A is a cross-sectional diagram illustrating a first internal electrode, and FIG. 6B is a cross-sectional diagram illustrating a second internal electrode;

FIG. 7A is a cross-sectional diagram illustrating a first internal electrode, and FIG. 7B is a cross-sectional diagram illustrating a second internal electrode;

FIG. 8A is a cross-sectional diagram illustrating a first internal electrode, and FIG. 8B is a cross-sectional diagram illustrating a second internal electrode.

DETAILED DESCRIPTION

Figure 1:
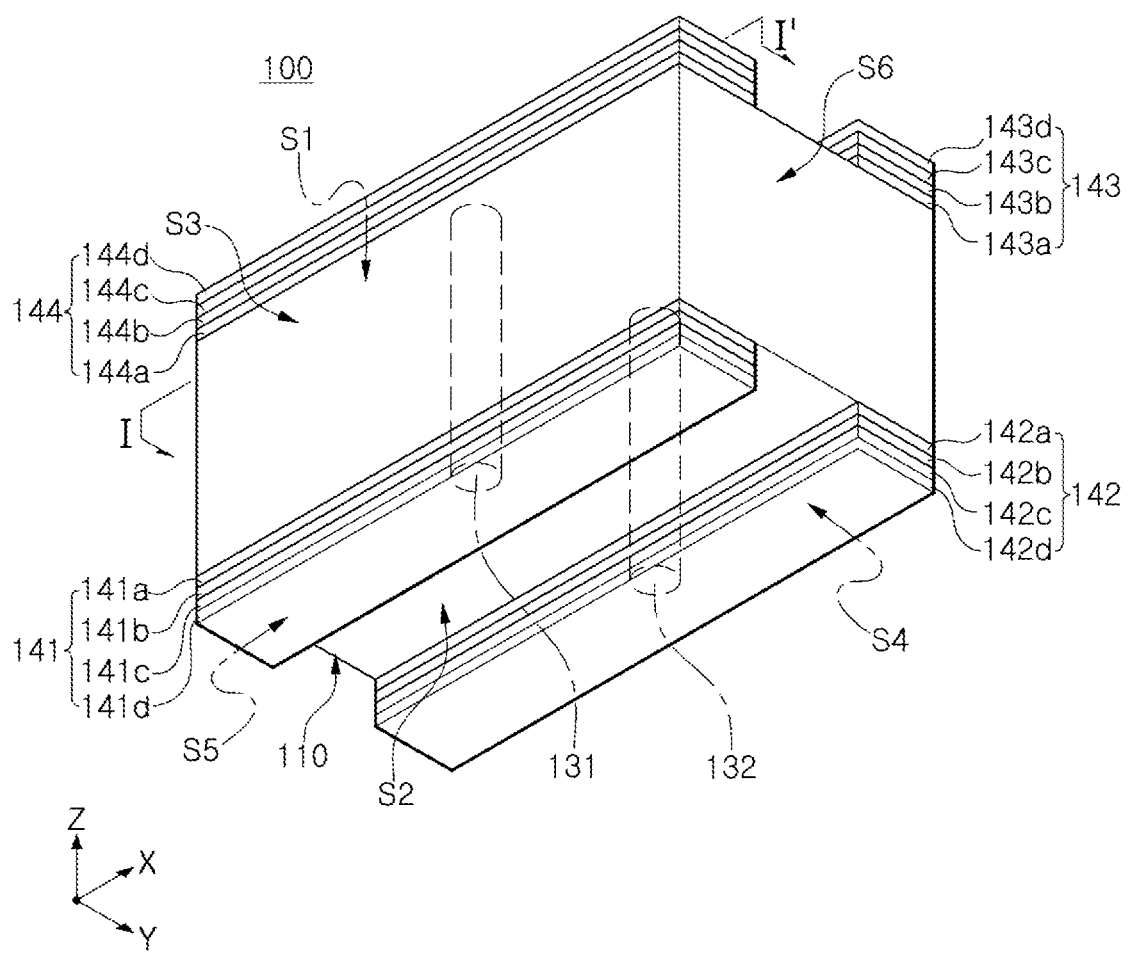
FIG. 1 is a perspective diagram illustrating a multilayer ceramic capacitor according to an exemplary embodiment of the present disclosure.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another exemplary embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

In the diagram, an X direction may be defined as an L direction or a length direction, a Y direction may be defined as a W direction or a width direction, and a Z direction may be defined as a T direction or a thickness direction.

In the description below, a multilayer ceramic capacitor will be described in greater detail in accordance with an exemplary embodiment with reference to FIGS. 1 to 3.

A multilayer ceramic capacitor 100 in the exemplary embodiment may include a body 110 including a dielectric layer 111 and first and second internal electrodes 121 and 122 disposed with the dielectric layer 111 interposed therebetween, and having first and second surfaces S1 and S2 opposing each other in a first direction (a Z direction), third and fourth surfaces S3 and S4 opposing each other in a second direction (a Y direction), and fifth and sixth surfaces S5 and S6 opposing each other in a third direction (an X direction); a first through electrode 131 penetrating the body 110 and connected to the first and second internal electrodes 121 and 122, a second through electrode 132 penetrating the body 110 and connected to the second internal electrode 122, first and second external electrodes 141 and 144 disposed on the first surface and the second surface, respectively, and connected to the first through electrode 131, third and fourth external electrodes 142 and 143 spaced apart from the first and second external electrodes 141 and 144 and connected to the second through electrode 132.

The first through electrode 131 and the second through electrode 132 may include nickel. The first to fourth external electrodes 141, 142, 143, and 144 may be configured as sintered electrodes 141a, 142a, 143a, and 144a including nickel, and may include first plating layers 141b, 142b, 143b, and 144b and second plating layers 141c, 142c, 143c, and 144c layered in order on the sintered electrodes 141a, 142a, 143a, and 144a.

In the body 110, the dielectric layer 111 and the first and second internal electrodes 121 and 122 may be alternately layered. A shape of the body 110 may not be limited to any particular shape, and may have a hexahedral shape or a shape similar to a hexahedron, as illustrated in the diagram. Due to contraction of ceramic powder included in the body 110 during a sintering process, the body 110 may not have an exact hexahedral shape with straight lines, but may have a substantially hexahedral shape.

The body 110 may have the first and second surfaces S1 and S2 opposing each other in a thickness direction (Z direction), the third and fourth surfaces S3 and S4 connected to the first and second surfaces S1 and S2 and opposing each other in a width direction (Y direction), and the fifth and sixth surfaces S5 and S6 connected to the first and second surfaces S1 and S2 and the third and fourth surfaces S3 and S4 and opposing each other in a length direction (X direction). One of the first, second, third, and fourth surfaces S1, S2, S3, and S4 may be configured as a mounting surface.

The plurality of dielectric layers 111 included in the body 110 may be in a sintered state, and the dielectric layers 111 may be integrated such that it may be difficult to identify boundaries between adjacent dielectric layers 111 without using a scanning electron microscope (SEM).

In the exemplary embodiment, a material of the dielectric layer 111 may not be limited to any particular material as long as sufficient capacitance can be obtained therewith. For example, the dielectric layer 111 may be formed using a barium titanate material, a Perovskite material compound with lead (Pb), a strontium titanate material, or the like. The barium titanate material may include a $BaTiO_3$ based ceramic powder, and an example of the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), and the like, are partially solidified. As the material of the dielectric layer 111, a barium titanate (BaTiO3) powder, or the like, including various ceramic additives, organic solvents, coupling agents, dispersing agents, and the like, may be used depending on an intended purpose.

First and second cover portions 112 and 113 each having a certain thickness may be formed in a lower portion of a lowermost internal electrode and in an upper portion of an uppermost internal electrode of the body 110. The first and second cover portions 112 and 113 may have the same composition as a composition of the dielectric layer 111, and the first and second cover portions 112 and 113 may be formed by layering at least one or more of dielectric layers which do not include an internal layer in each of an upper portion of an uppermost internal electrode and a lower portion of a lowermost internal electrode of the body 110.

The internal electrodes 121 and 122 may include the first and second internal electrodes 121 and 122 alternately disposed with the dielectric layer 111 interposed therebetween and opposing each other.

The first and second internal electrodes 121 and 122 may include first and second insulating portions 121a and 122a, respectively. The first and second insulating portions 121a and 122a may refer to regions in which the first and second internal electrodes 121 and 122 are not disposed, and may configured to connect the first and second internal electrodes 121 and 122 to external electrodes having different polarities. Accordingly, a first connection electrode 131 may be spaced apart from the second internal electrode 122 by the first insulating portion 121a, and a second connection electrode 132 may be spaced apart from the first internal electrode 121 by the second insulating portion 122a.

By connecting the first and second internal electrodes 121 and 122 to the first to fourth external electrodes 141, 142, 143, and 144 by the first and second through electrodes 131 and 132, an area of overlap between the first and second internal electrodes 121 and 122 with the dielectric layer 111 interposed therebetween may increase, and accordingly, capacitance of the multilayer ceramic capacitor 100 may increase.

The first and second internal electrodes 121 and 122 may include a large amount of nickel (Ni), but a composition of the first and second internal electrodes 121 and 122 is not limited thereto. For example, the first and second internal electrodes 121 and 122 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof. As a method of printing the conductive paste, a screen-printing method, a gravure printing method, or the like, may be used, but the printing method is not limited thereto.

The through electrodes 131 and 132 may include a large amount of nickel (Ni), but a composition of the first and second through electrodes 131 and 132 is not limited thereto. For example, the first and second through electrodes 131 and 132 may be formed using a conductive paste including one or more materials from among silver (Ag), palladium (Pd), gold (Au), platinum (Pt), nickel (Ni), tin (Sn), copper (Cu), tungsten (W), titanium (Ti), and alloys thereof. A method of forming the through electrodes 131 and 132 is not limited to any particular method. For example, the first and second through electrodes 131 and 132 may be formed by forming a laminate in which the dielectric layer 111, the first internal electrode 121, and the second internal electrode 122 are layered, drilling the body 110 in the first direction (Z direction) using a laser drill, a mechanical pin puncher, and the like, and filling the drilled portion with the above-described conductive paste.

In an exemplary embodiment, the internal electrodes 121 and 122 and the through electrodes 131 and 132 may include the same metal composition. The same metal material may be nickel (Ni), but an exemplary embodiment thereof is not limited thereto. For example, the metal material may include one or more elements from among silver (Ag), palladium (Pd), gold (Au), platinum (Pt), nickel (Ni), tin (Sn), copper (Cu), tungsten (W), titanium (Ti), and alloys thereof. When the internal electrodes 121 and 122 and the through electrodes 131 and 132 of the multilayer ceramic capacitor include the same metal material, sintering initiation temperatures and/or sintering contraction rates of the internal electrodes 121 and 122 and of the through electrodes 131 and 132 may match such that cracks, delamination, and the like, may be prevented.

In the exemplary embodiment, each of the through electrodes 131 and 132 may have a rounded shape, but an example of the shape is not limited thereto. Each of the through electrodes 131 and 132 may have a rectangular shape or a triangular shape. Also, the through electrodes 131 and 132 may occupy 5 to 65% of an area of the body in the width direction (Y direction), but an exemplary embodiment thereof is not limited thereto.

In the exemplary embodiment, a thickness of the body 110 may be 100 μm or less. A thickness of the body 110 may be a vertical distance between the first surface and the second surface, and a lower limit of the thickness is not limited to any particular size. For example, the thickness may be 5 μm. By configuring a thickness of the body 110 to be 100 μm or less, the multilayer ceramic capacitor in the exemplary embodiment may be applied to a multilayer ceramic capacitor embedded in a substrate and/or a capacitor mounted on a lower end of an AP in LSC type.

In the exemplary embodiment, the first to fourth external electrodes 141, 142, 143, and 144 may be disposed on both surfaces of the body 110. The first and second external electrodes 141 and 144 may be disposed on the first surface S1 and the second surface S2 of the body 110, respectively, and may be electrically connected to each other through the first through electrode 131. The third and fourth external electrodes 142 and 143 may be spaced apart from the first and second external electrodes 141 and 144, may be disposed on the first surface S1 and the second surface S2 of the body 110, respectively, and may be electrically connected to each other by the second through electrode 132.

In the multilayer ceramic capacitor 100 having the above-described structure, a region in which the first and second internal electrodes 121 and 122 are disposed may increase by reducing margin portions of side surfaces connecting an upper surface and a lower surface of the body 100, thereby significantly improving capacitance of the multilayer ceramic capacitor 100. Thus, the multilayer ceramic capacitor 100 in the exemplary embodiment may have an electrode structure in which an external electrode is not disposed on a side surface, and the internal electrode may be configured to be connected to the external electrode by the through electrode penetrating the body. Accordingly, capacitance may significantly improve.

In the description below, a structure of the external electrode will be described with reference to the first external electrode 141, and the description of the external electrode may be applied to the second to fourth external electrodes 142, 143, and 144.

Figure 2:
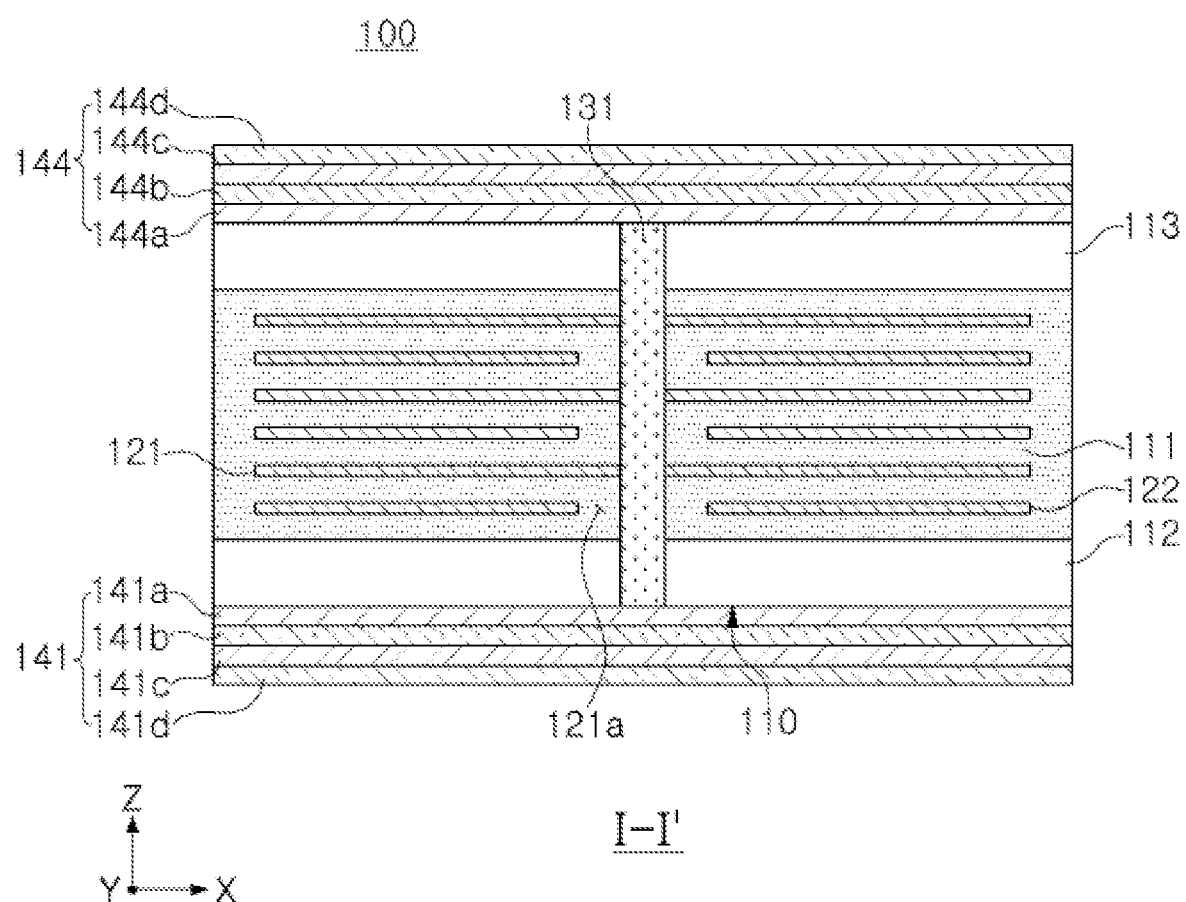
FIG. 2 is a cross-sectional diagram taken along line I-I' in FIG. 1.
Figure 3A:
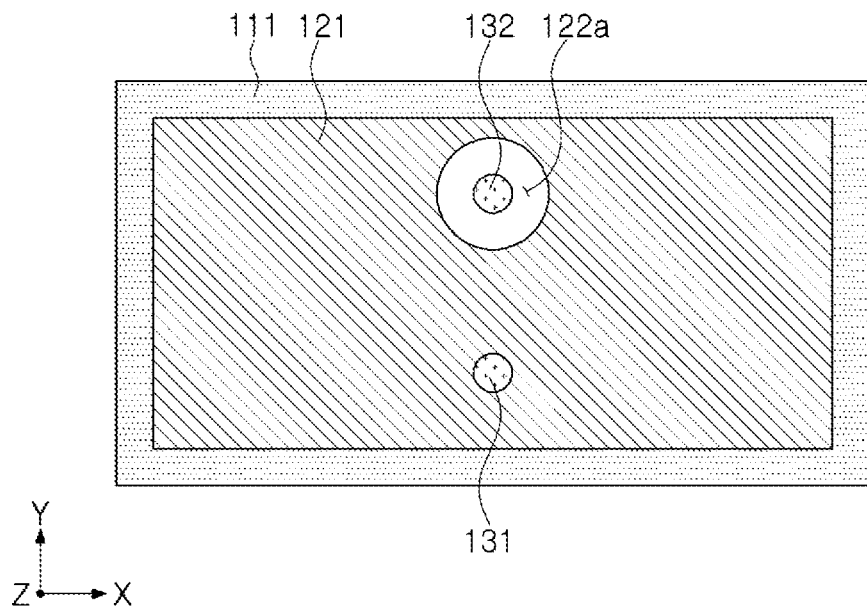
FIGS. 3A and 3B are cross-sectional diagrams taken in an X direction and a Y direction in FIG. 1.
Figure 3B:
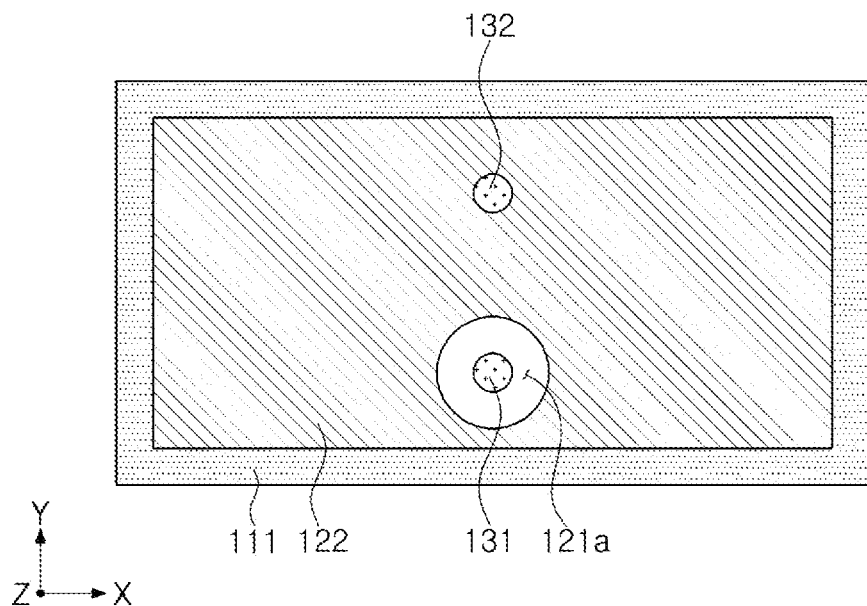

Referring to FIG. 2, the first external electrode 141 may include a first sintered electrode 141a, and first and second plating layers 141b and 141c. The first sintered electrode 141a may include one or more materials from among silver (Ag), palladium (Pd), gold (Au), platinum (Pt), nickel (Ni), tin (Sn), copper (Cu), tungsten (W), titanium (Ti), and alloys thereof, and may be configured as a sintered electrode formed by sintering a conductive paste including nickel (Ni), for example. When the external electrode is configured as a sintered electrode as the first sintered electrode 141a, the external electrode may be simultaneously sintered with a body and an internal electrode, and cohesion strength between the body and the external electrode may improve.

The first plating layer 141b in the exemplary embodiment may include tin. Generally, as an oxide layer may be formed on a surface of a sintering electrode including nickel, it may be difficult to form the plating layer on a sintered electrode, a formed plating layer may be easily separated, and other issues may occur. In the multilayer ceramic capacitor, by disposing the first plating layer 141b including tin, which may have excellent plating properties, on the first sintered electrode 141a including nickel, the plating layer may be uniformly formed.

The second plating layer 141c may include nickel. The second plating layer 141c including nickel may be applied on the first plating layer 141b including tin, thereby improving strength of the plating layer while maintaining excellent electrical conductivity.

In the exemplary embodiment, a ratio of a minimum value to a maximum value of a thickness of the second plating layer 141c may be within a range of 0.8 to 1.0. A method of adjusting the ratio of a minimum value to a maximum value of a thickness of the second plating layer 141c is not limited to any particular method. For example, a thickness of the second plating layer 141c may be uniformly formed by forming a uniform plating film on the first plating layer 141b by applying a plating layer including tin as described above.

In an exemplary embodiment, the multilayer ceramic capacitor may further include a third plating layer 141d including tin or copper on the second plating layer 141c. As the third plating layer 141d includes copper or tin, an external electrode having improved conductivity, plating cohesion properties, and soldering properties may be formed.

In the exemplary embodiment, a thickness of each of the first to fourth external electrodes 141, 142, 143, and 144 may be within a range of 1 μm to 30 μm. A thickness of each of the first to fourth external electrodes 141, 142, 143, and 144 may refer to a total thickness of the sintered electrode, the first plating layer, and the second plating layer, which are layered as described above, and may refer to a vertical distance to a surface of the external electrode from the body. By adjusting a thickness of the external electrode to be within the above-mentioned range, the multilayer ceramic capacitor may not occupy a relatively large space when the multilayer ceramic capacitor is mounted on a surface of a substrate or embedded in a substrate, and the multilayer ceramic capacitor may have improved mounting properties.

FIGS. 4 to 7 are diagrams illustrating a multilayer ceramic capacitor according to another exemplary embodiment. Another exemplary embodiment of a multilayer ceramic capacitor will be described in detail with reference to FIGS. 4 to 7.

Figure 4:
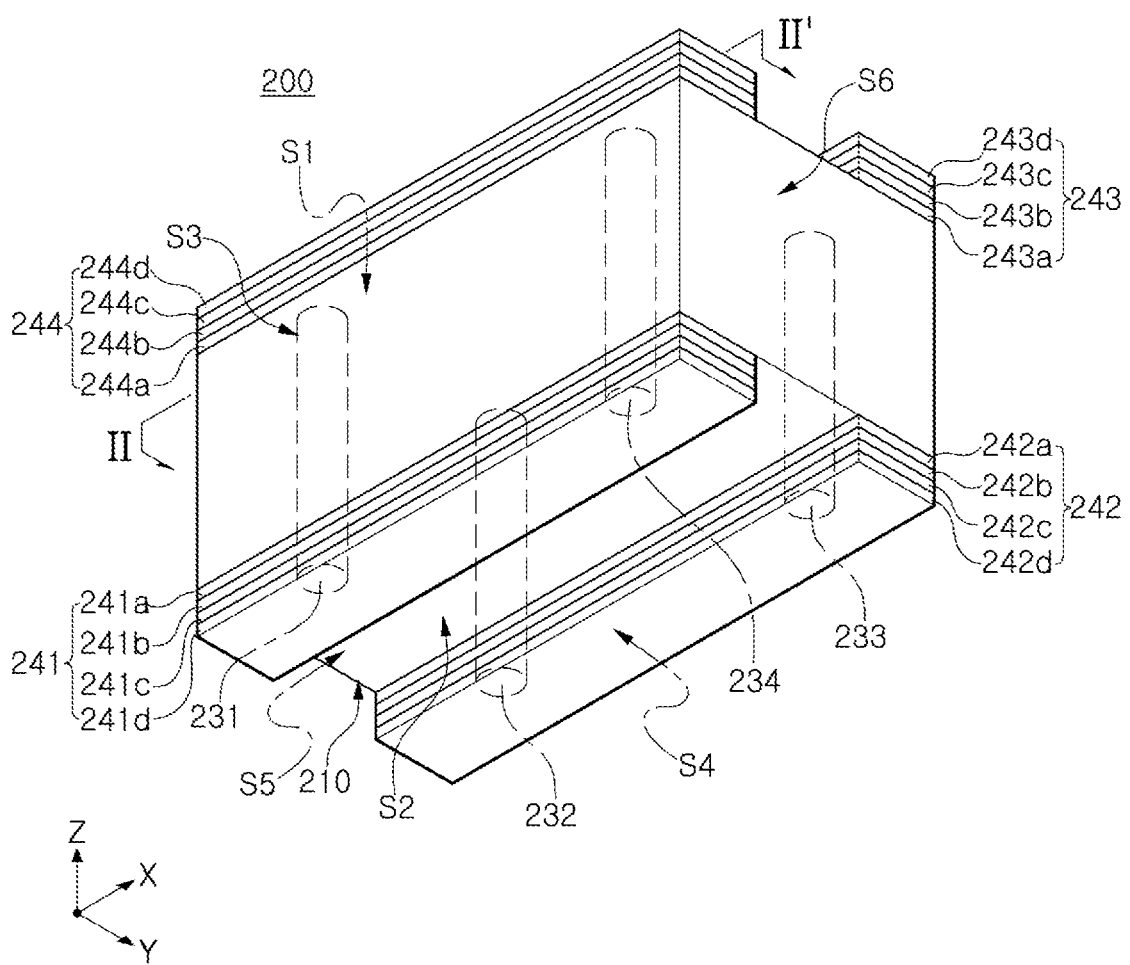
FIG. 4 is a perspective diagram illustrating a multilayer ceramic capacitor according to another exemplary embodiment of the present disclosure.
Figure 5:
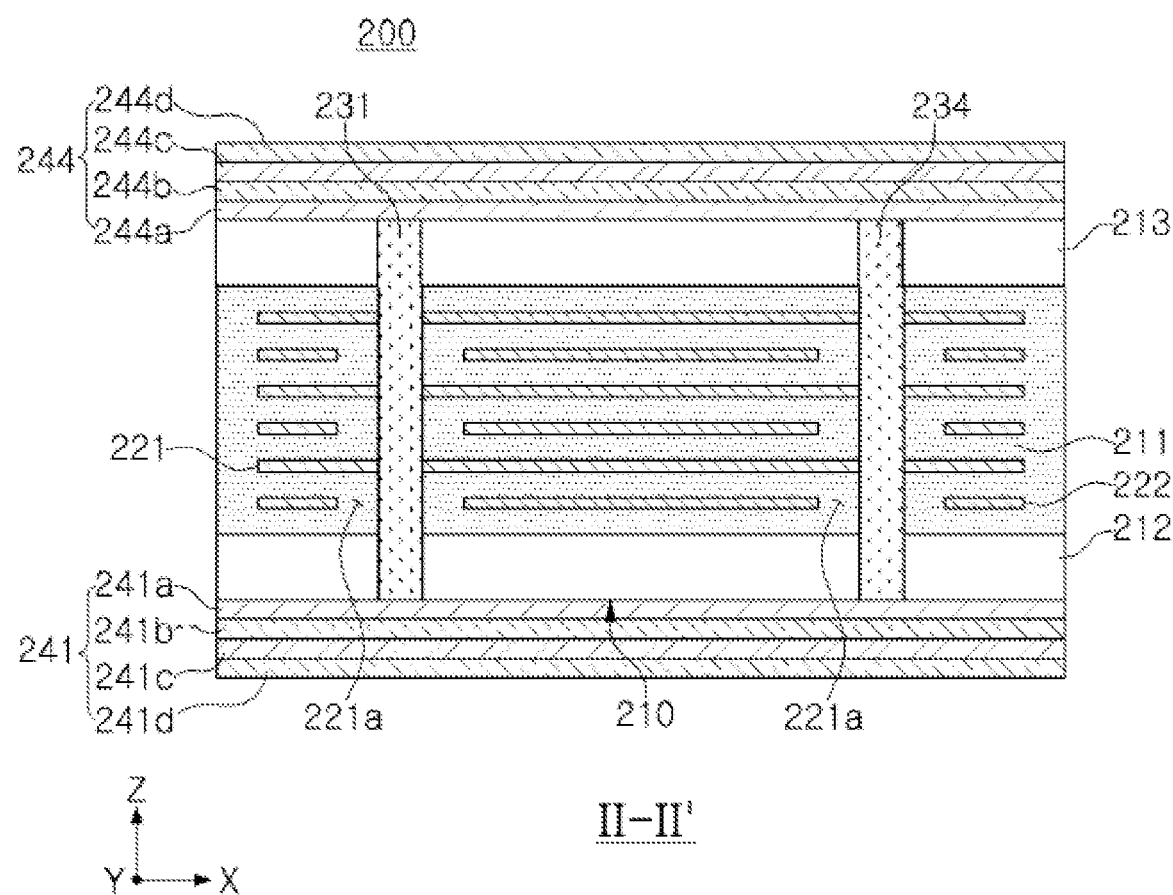
FIG. 5 is a cross-sectional diagram taken along line II-II' in FIG. 4.

Referring to FIGS. 4 and 5, a multilayer ceramic capacitor 200 in the exemplary embodiment may include a body 210 including a first internal electrode 221, a dielectric layer 211, and a second internal electrode 222 layered therein, first to fourth connection electrodes 231, 232, 233, and 234, and first to fourth external electrodes 241, 242, 243, and 244. The compositions and configurations of the dielectric layer 211, the first and second internal electrodes 221 and 222, and the first to fourth external electrodes 241, 242, 243, and 244 are the same as the compositions and configurations of the dielectric layer, the first and second internal electrodes, and the first to fourth external electrodes described in the aforementioned exemplary embodiment, and thus, the descriptions thereof will not be repeated.

The multilayer ceramic capacitor 200 in the exemplary embodiment may include a first connection electrode 231, a second connection electrode 232, a third connection electrode 233, and a fourth connection electrode 234. The first and fourth connection electrodes 231 and 234 may be electrically connected to the first and second external electrodes 241 and 244, and the second and third connection electrodes 232 and 233 may be electrically connected to the third and fourth external electrodes 243 and 242. As described above, by disposing a plurality of the connection electrodes connecting the first external electrode, the second external electrode, the third external electrode, and the fourth external electrode, cohesion force between the external electrode and the body may improve.

According to an exemplary embodiment of the present disclosure, the first to fourth external electrodes 241, 242, 243, and 244 may be configured as sintered electrodes 241a, 242a, 243a, and 244a including nickel, and may include first plating layers 241b, 242b, 243b, and 244b and second plating layers 241c, 242c, 243c, and 244c layered in order on the sintered electrodes 241a, 242a, 243a, and 244a. Each of the first plating layers 241b to 244b may include tin. Each of the second plating layers 241c to 244c may include nickel.

The multilayer ceramic capacitor 200 may further include third plating layers 241d to 244d including tin or copper on second plating layers 241c to 244c, respectively.

Figure 6A:
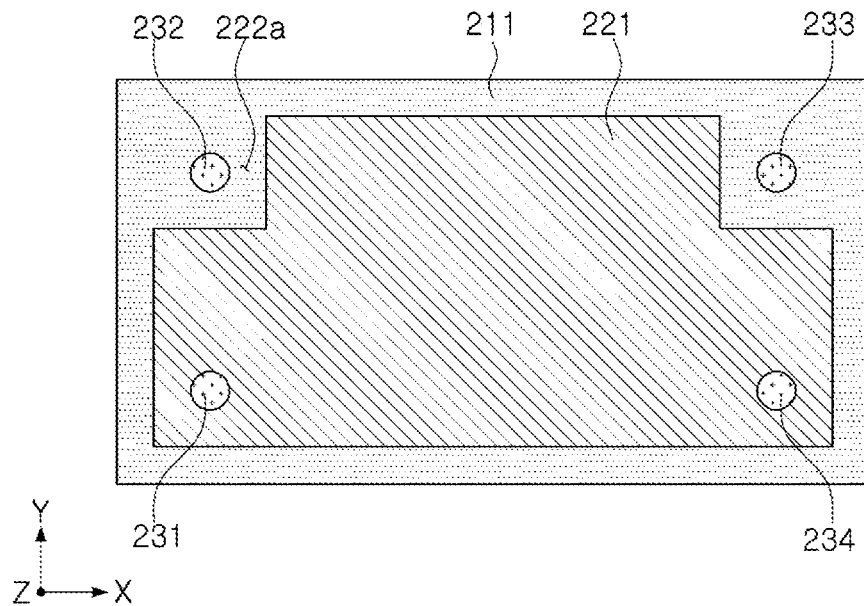
FIGS. 6A and 6B are cross-sectional diagrams taken in an X direction and a Y direction in FIG. 4.
Figure 6B:
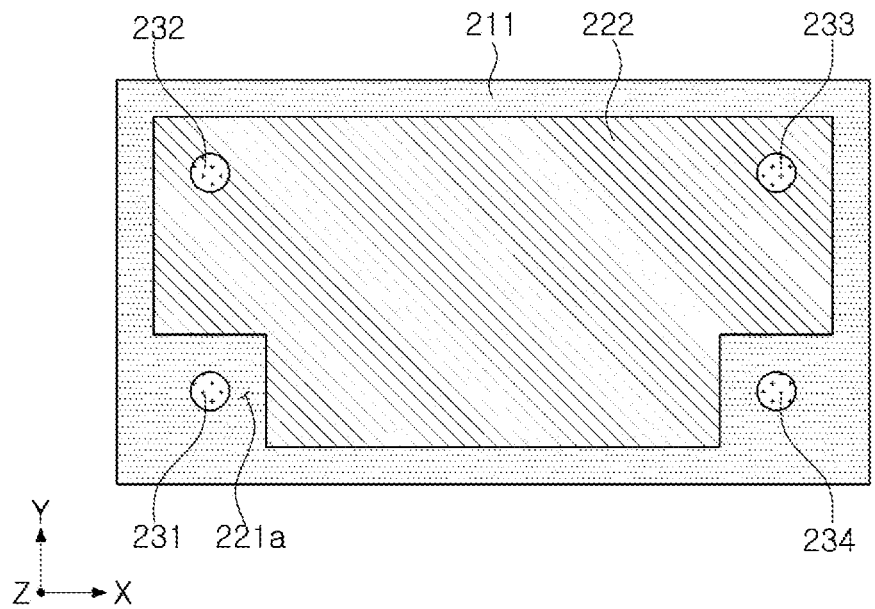

FIG. 6 is a cross-sectional diagram illustrating a form of the first internal electrode 221 and the second internal electrode 222. Referring to FIG. 6, each of the first internal electrode 221 and the second internal electrode 222 may have a T-shaped form, and the first internal electrode 221 and the second internal electrode 222 may be disposed in point-symmetry with each other. The first internal electrode 221 may have a T-shaped electrode pattern, and a region 222a in which an electrode is not disposed, a region where an electrode pattern is not formed, may be an insulating region. The second internal electrode 222 may have a T-shaped electrode pattern, and a region 221a in which an electrode is not disposed, a region where an electrode pattern is not formed, may be an insulating region.

In the multilayer ceramic capacitor having the above-described electrode pattern, the first and fourth connection electrodes 231 and 234 may be connected to the first internal electrode 221, and may penetrate the region 222a of the second internal electrode 222 in which an electrode is not disposed. Also, the second and third connection electrodes 232 and 233 may be connected to the second internal electrode 222, and may penetrate the region 222a of the first internal electrode 221 in which an electrode is not disposed. As the connection electrodes penetrate the region of the internal electrode in which an electrode is not disposed, the multilayer ceramic capacitor may have improved ESL by offsetting mutual inductance, and may have increased capacitance as compared to the configuration in which a via hole is formed on an internal electrode.

Figure 7A:
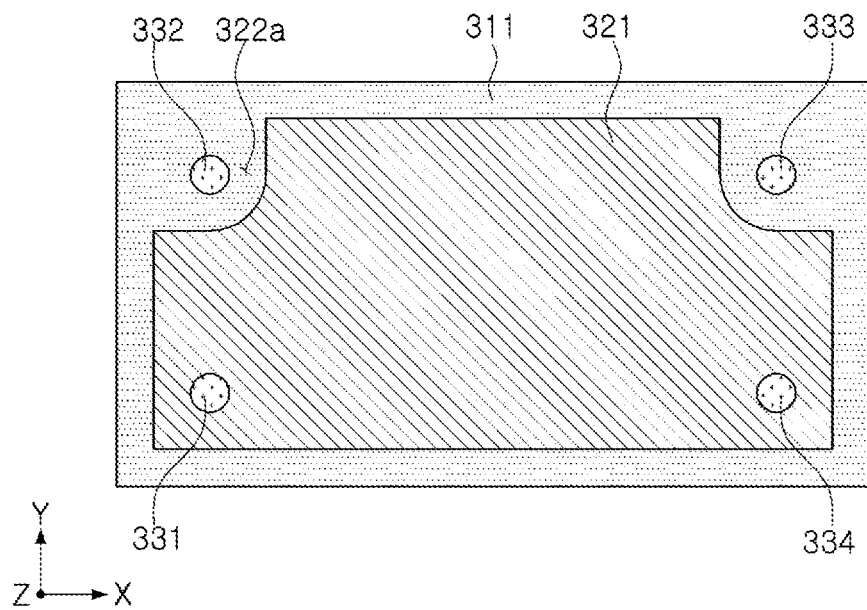
FIGS. 7A and 7B are cross-sectional diagrams taken in an X direction and a Y direction in FIG. 4, illustrating a multilayer ceramic capacitor according to another exemplary embodiment of the present disclosure.
Figure 7B:
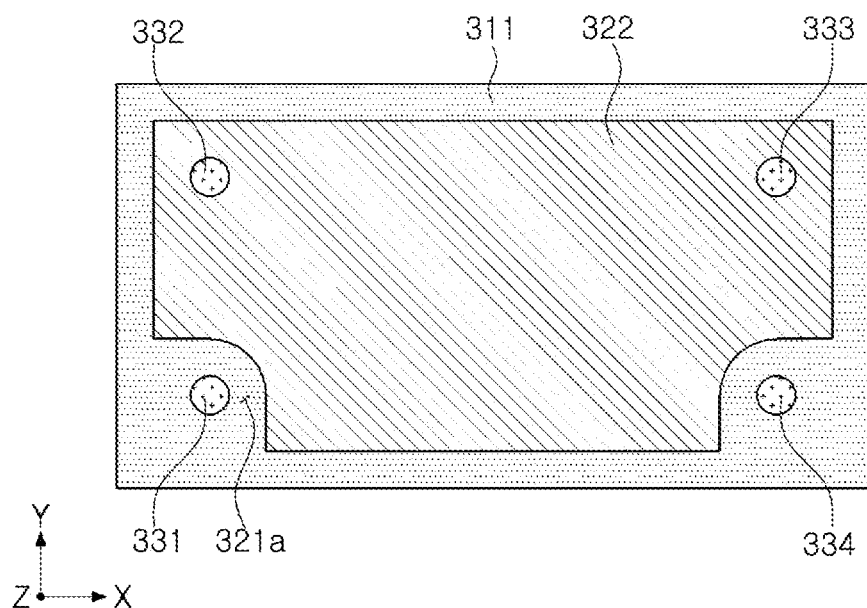

In an exemplary embodiment, each of regions 321a and 322a in which the first and second internal electrodes 321 and 322 are not disposed may have a rounded shape. Referring to FIG. 7, the first internal electrode 321 may have a T-shaped electrode pattern, and the region 322a in which the internal electrode is not disposed may have a rounded shape. The second internal electrode 322 may have a T-shaped electrode pattern, and the region 321a in which an internal electrode is not disposed may have a rounded shape. By configuring a recessed portion of the internal electrode to have a rounded shape as described above, capacitance may improve.

In the exemplary embodiment described above, the region in which an internal electrode is not disposed may have a rectangular shape or a rounded shape, but a shape of the internal electrode pattern is not limited thereto. The internal electrode pattern may have a triangular shape, a polygonal shape, or various other shapes, for example.

Figure 8A:
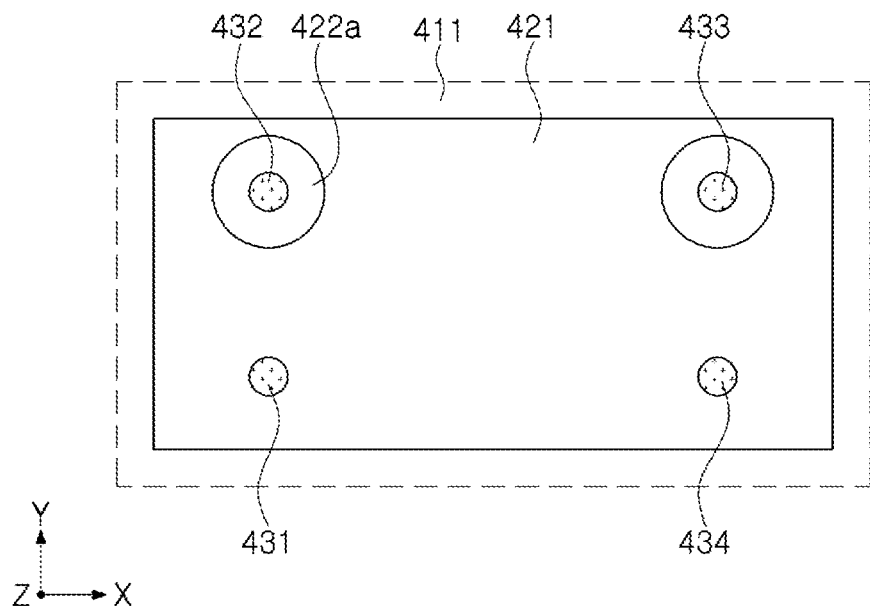
FIGS. 8A and 8B are cross-sectional diagrams taken in an X direction and a Y direction in FIG. 4, illustrating a multilayer ceramic capacitor according to another exemplary embodiment of the present disclosure.
Figure 8B:
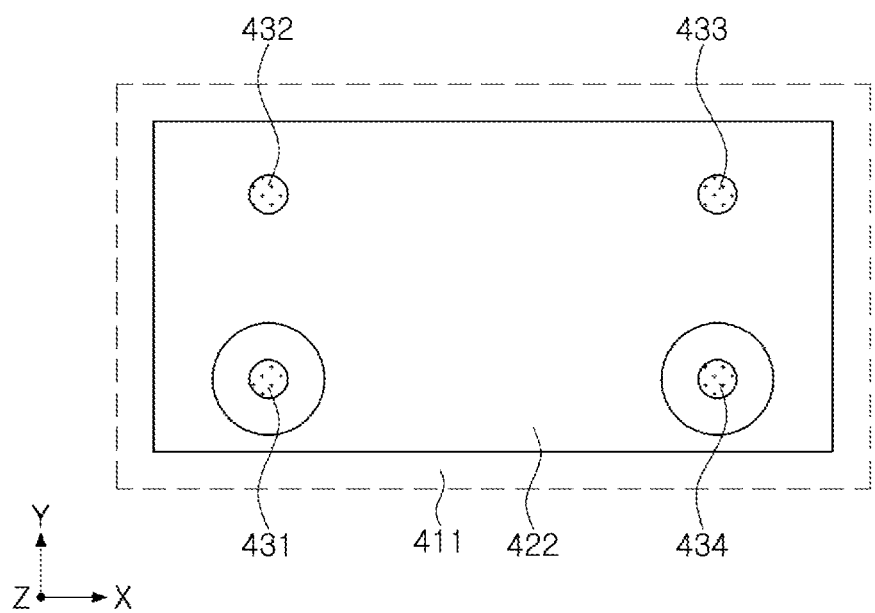
Figure 9:
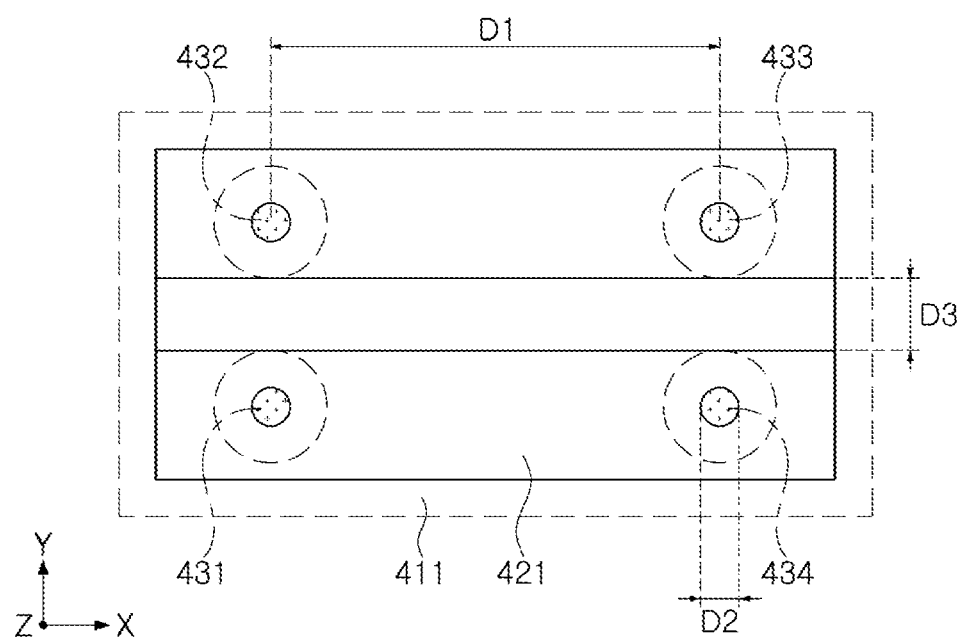
FIG. 9 is a plan diagram illustrating a multilayer ceramic capacitor illustrated in FIG. 4, viewed in an S1 direction.

FIGS. 8 and 9 are cross-sectional diagrams illustrating another exemplary embodiment. Referring to FIGS. 8 and 9, first and second internal electrodes 421 and 422 may be disposed in point-symmetry, and each of the first and second internal electrodes 421 and 422 may have a rectangular shape. The first internal electrode 421 may include second and third via holes, and the second internal electrode 422 may include first and fourth via holes. First and fourth connection electrodes 431 and 434 may be connected to the first internal electrode 421, and may penetrate the first and fourth via holes of the second internal electrode 422. Second and third connection electrodes 432 and 433 may be connected to the second internal electrode 422, and may penetrate the second and third via holes of the first internal electrode 421. As the first and fourth connection electrodes 431 and 434 penetrate the first and fourth via holes of the second internal electrode 422, the first and fourth connection electrodes 431 and 434 may be electrically insulated from the second internal electrode 422. Also, as the second and third connection electrodes 432 and 433 penetrate the second and third via holes of the first internal electrode 421, the second and third connection electrodes 432 and 433 may be electrically insulated from the first internal electrode 421.

FIG. 9 illustrates a gap between the first and fourth connection electrodes 431 and 434 or a gap D1 between the second and third connection electrodes 432 and 433, a diameter of each of the first to fourth connection electrodes 431, 432, 433, and 434, and a gap between the first and second via holes or a gap D3 between the third via hole and the fourth via hole.

Referring to FIG. 9, a ratio (D1/D3) of a gap between the first and fourth connection electrodes 431 and 434 or the gap D1 between the second and third connection electrodes 432 and 433 to the gap D3 between the first and second via holes may be 2.08 to 4.7. The ratio (D1/D3) may be 2.08 or higher, 2.20 or higher, 2.30 or higher, 2.40 or higher, 2.50 or higher, 2.60 or higher, 2.70 or higher, 2.80 or higher, 2.90 or higher, 3.00 or higher, 3.05 or higher, 3.10 or higher, or 3.15 or higher, and may be 4.700 or lower, 4.695 or lower, 4.690 or lower, or 4.688 or lower, but an exemplary embodiment thereof is not limited thereto. When the ratio (D1/D3) of a gap between the first and fourth connection electrodes 431 and 434 or the gap D1 between the second and third connection electrodes 432 and 433 to the gap D3 between the first and second via holes satisfies the above-mentioned ranges, equivalent series inductance (ESL) may decrease, and when the ratio is 3.125 or higher, an effect of a reduction in ESL may increase.

In the exemplary embodiment, a ratio D2/D3 of a diameter D2 of the first connection electrode or the second connection electrode to a gap D3 between the first via hole and the second via hole may be within a range of 0.375 to 0.52. The ratio D2/D3 of a diameter D2 of the first connection electrode or the second connection electrode to the gap D3 between the first via hole and the second via hole may be 0.375 or higher, 0.380 or higher, 0.385 or higher, 0.390 or higher, 0.395 or higher, 0.400 or higher, 0.405 or higher, or 0.410 or higher, and may be 0.52 or lower. When the ratio D2/D3 of the diameter D2 of the first connection electrode or the second connection electrode to the gap D3 between the first via hole and the second via hole satisfies the above-mentioned ranges, ESL may decrease. When the ratio is 0.41 or higher, an effect of reduction in ESL may increase, and when the ratio is 0.52 or higher, capacitance may decrease.

In the description below, a method of manufacturing a multilayer ceramic capacitor will be described.

A body including dielectric layers and first and second internal electrodes disposed with the dielectric layer interposed therebetween may be formed by layering a sheet on which a paste including a conductive metal is printed on one surface of a ceramic green sheet including a dielectric layer in certain thickness. A first cover portion and a second cover portion may be formed by layering a dielectric layer which does not include an internal electrode on upper and lower portions of the body.

After forming the cover portions, a via H may be formed in the body using a laser drill, a mechanical pin puncher, or the like. The via H may be coated with a conductive paste, or may be filled with a conductive material through a plating process, or the like, thereby forming first and second through electrodes.

First to fourth external electrodes connected to the first and second through electrodes may be formed on one surface of the body.

For example, the forming the first to fourth external electrodes may include forming first to fourth sintered electrodes including nickel on the body, forming a first plating layer on each of the first to fourth sintered electrodes, forming a second plating layer on the first plating layer, and forming a third plating layer on the second plating layer.

The sintered electrodes may be formed by coating a surface with a conductive paste including nickel and sintering the paste, the first plating layer may include tin and may be formed by an electrical or chemical plating method, and the second plating layer may include nickel and may be formed by an electrical or chemical plating method. The third plating layer may include copper or tin and may be formed by an electrical or chemical plating method.

After forming the sintered electrode layers, a bake-out process and a sintering process may be performed, and the first plating layer and the second plating layer may be formed, thereby manufacturing the multilayer ceramic capacitor illustrated in FIGS. 1 and 4.

According to the aforementioned exemplary embodiments, by forming the external electrode including nickel, mechanical strength of the multilayer ceramic capacitor may improve.

Also, by applying the sintered electrode including nickel to the external electrode connected to the through electrode including nickel, adhesive properties between the through electrode and the external electrode may improve.

Further, by applying tin to the first plating layer disposed on a surface of the external electrode, a nickel plating layer may be formed on the nickel sintered electrode.

Also, by applying the nickel plating layer to the nickel sintered electrode, the plating layer may be uniformly formed.

Also, the low-profile multilayer ceramic capacitor having improved cohesion force with a substrate may be provided.

Also, reliability of a product may improve by preventing cracks caused by a miss-match, or the like, during a sintering process.

While the exemplary embodiments have been shown and described above, it will be apparent to those skilled in the art that modifications and variations could be made without departing from the scope of the present invention as defined by the appended claims.

What is claimed is:

1. A multilayer ceramic capacitor, comprising:
   a body including a dielectric layer and first and second internal electrodes disposed with the dielectric layer interposed therebetween in a stacking direction;
   first and second through electrodes penetrating the body, connected to the first and second internal electrodes, respectively, and including nickel;
   first and second external electrodes respectively disposed on first and second surfaces opposing each other in the stacking direction, and connected to the first through electrode; and
   third and fourth external electrodes spaced apart from the first and second external electrodes, and connected to the second through electrode,
   wherein each of the first to fourth external electrodes comprises:
   a sintered electrode including nickel;
   a first plating layer including tin and directly stacked on the sintered electrode; and
   a second plating layer including nickel and directly stacked on the first plating layer.

2. The multilayer ceramic capacitor of claim 1, wherein a ratio of a minimum value to a maximum value of a thickness of the second plating layer is within a range of 0.8 to 1.0.

3. The multilayer ceramic capacitor of claim 1, further comprising:
   a third plating layer directly disposed on the second plating layer and including tin or copper.

4. The multilayer ceramic capacitor of claim 1, wherein the first and second internal electrodes include nickel.

5. The multilayer ceramic capacitor of claim 1, wherein a thickness of each of the first to fourth external electrodes is within a range of 1 μm to 30 μm.

6. The multilayer ceramic capacitor of claim 1, wherein the first to fourth external electrodes are simultaneously sintered with the body.

7. The multilayer ceramic capacitor of claim 1, wherein a thickness of the body is 100 μm or less.

8. The multilayer ceramic capacitor of claim 1,
   wherein the first through electrode includes first and fourth connection electrodes connected to the first and second external electrodes, and
   wherein the second through electrode includes second and third connection electrodes connected to the third and fourth external electrodes.

9. The multilayer ceramic capacitor of claim 8,
   wherein each of the first and second internal electrodes has a T-shaped form, and the first and second internal electrodes are disposed in point-symmetry with each other, wherein the first and fourth connection electrodes penetrate a region in which the second internal electrode is not disposed, and wherein the second and third connection electrodes penetrate a region in which the first internal electrode is not disposed.

10. The multilayer ceramic capacitor of claim 9, wherein each of the regions in which the first and second internal electrodes are not disposed have a rectangular shape.

11. The multilayer ceramic capacitor of claim 9, wherein each of the regions in which the first and second internal electrodes are not disposed has a rounded shape.

12. The multilayer ceramic capacitor of claim 1, wherein the body has a first surface and a second surface opposing each other in a first direction, a third surface and a fourth surface opposing each other in a second direction, and a fifth surface and a sixth surface opposing each other in a third direction.

\* \* \* \* \*